United States Patent Office 2,793,986
Patented May 28, 1957

2,793,986

PROCESS AND CATALYST FOR HYDROGENATION OF KEROSENE TO REMOVE COLOR AND FLUORESCENCE

William C. Lanning, Bartlesville, Okla., assignor to Phillips Petroleum Company, a corporation of Delaware No Drawing. Application November 25, 1952,
Serial No. 322,567

3 Claims. (Cl. 196—35)

This invention relates to the refining of hydrocarbons and mixtures thereof. In one aspect, it relates to a catalytic hydrogenation treatment of kerosene to render the latter color-stable and nonfluorescent. In another aspect, it relates to a novel catalyst and a method for preparing said catalyst.

The improvement of color stability of kerosene and the rendering of kerosene nonfluorescent are desirable because they increase the marketability of the kerosene. Most kerosene consumers demand a color-stable, nonfluorescent kerosene. Kerosene used as a carrier for insecticides and similar materials should be substantially colorless and color-stable in order to avoid staining materials with which it may come in contact. When kerosene or fractions thereof are used as thinners or vehicles for paints or coatings, color instability is also undesirable.

It is known to treat kerosene with or without hydrogen in the presence of a molybdena-alumina catalyst at temperatures of 750° F. and higher in order to desulfurize the kerosene. However, the products so obtained have unacceptable color and, in some cases, are fluorescent. Also, the use of temperatures above 750° F. in prior art processes often effects substantial decomposition of the material treated and loss of the material by gas and coke formation.

The color instability is ordinarily manifested by a perceptible darkening upon storage for several months, particularly when the kerosene is stored in contact with iron.

The term "kerosene" is used herein to designate predominantly nonolefinic hydrocarbon fractions that boil within the range 200–600° F.

According to this invention, kerosene is rendered color-stable and nonfluorescent by contacting it, together with elemental hydrogen, with a novel catalyst, subsequently described herein, under controlled conditions of temperature, pressure, and space velocity. In the process of this invention, substantially no kerosene loss, due to decomposition, occurs.

The temperature of treatment, according to this invention, is in the range 500 to 650° F., preferably 550 to 625° F. The pressure is in the range 100 to 250 p. s. i., preferably 150 to 225 p. s. i. Temperatures higher than 650° F. result in a product of undesired color. Pressures below 100 p. s. i. result in improved color only in the case of untreated kerosenes already having extremely high color. Pressures higher than 250 p. s. i. frequently result in products of poor color.

The liquid hourly space velocity, according to the invention, is in the range 1 to 2. The hydrogen flow rate is in the range 1000 to 5000 cubic feet per barrel of kerosene treated.

The catalyst, according to this invention, is prepared from a mixture of the oxides of molybdenum, silicon, and aluminum. Molybdenum trioxide is a suitable starting component, and ammonium molybdate can be substituted for the oxide if desired. The starting mixture comprises from 2 to 20 weight percent molybdenum oxide, from 0.1 to 10 weight percent silica, and the remainder alumina, preferably in the form of the powdered oxides (100–325 mesh size). Commercial silica and alumina gels are preferred.

The catalyst of this invention is prepared by digesting an oxide mixture, as described above, with a mixture of ammonium nitrate and concentrated nitric acid, evaporating the digested mixture, and heating the residue at an elevated temperature for a time sufficient to decompose substantially all of the nitrates in the residue. The residue may be treated with hydrogen sulfide at an elevated temperature, if desired.

The catalyst of this invention is preferably prepared by the following steps:

(1) The oxide mixture is digested, with a mixture of concentrated nitric acid and ammonium nitrate at a temperature in the range 100 to 300° F. for a period of from 5 to 60 hours. Longer times can be used if desired. The concentration of the nitric acid is from 40 to 80 weight percent $HNO_3$. A weight of nitric acid chemically equivalent to from 0.5 to 5 times the weight of the alumina present is used. The weight of ammonium nitrate is from 0.1 to 2 times the weight of alumina present.

(2) After digestion, the mixture is evaporated to apparent dryness.

(3) The dry residue is heated to decompose the nitrates present. A temperature in the range 700 to 800° F. and a time in the range 20 to 50 hours are usually used for this step, although shorter times can be used when a carrier gas or vacuum is used to facilitate removal of nitrogen oxides.

(4) The decomposed residue is ground to a particle size in the range 100 to 350 mesh.

(5) The ground residue is mixed with an organic binder, such as hydrogenated corn oil or hydrogenated peanut oil, and formed into pellets.

(6) The pellets are heated in an oxygen-containing atmosphere, such as air, to remove the binder. A temperature in the range 950 to 1050° F. and a time in the range 10–30 hours are suitable for this step.

(7) The ignited pellets are contacted with hydrogen sulfide at a temperature in the range 700 to 800° F. for a time in the range 3 to 5 hours. This step can be omitted if desired, but is preferably included because it confers upon the catalyst additional resistance to deactivation.

The catalyst, prepared as described above, can be used for reactions other than the refining of kerosene. Examples of such reactions are hydrogenation of unsaturates, hydrogenolysis of heavy hydrocarbon oils and tars, and desulfurization of hydrocarbons.

EXAMPLE I

A commercially available catalyst containing 10 weight percent molybdenum trioxide, 5 weight percent silica and 85 weight percent alumina was treated to prepare a catalyst according to my invention. After pulverization, the catalyst was digested for 69 hours with 1 part by weight of ammonium nitrate and 2 parts of 49 percent nitric acid under total reflux. The mixture was evaporated and decomposed by heating to 750° F. in 4 hours and maintaining at that temperature for 44 hours. The residue was then heated in a muffle furnace for 12 hours at 750° F., mixed with 10 weight percent Sterotex (hydrogenated vegetable oil binder), ground to pass a 100 mesh sieve and formed into ⅛-inch pills. The Sterotex was removed by heating in a stream of air to 1000° F. in 3 hours and maintaining that temperature for 21 hours. The catalyst was presulfided before use by treatment with hydrogen sulfide at 700–800° F. for from 3 to 5 hours.

A portion of the untreated commercial catalyst was used for comparison after presulfiding, as a kerosene refining catalyst. This catalyst had been prepared by impregnation of a unigel type silica-alumina with molybdena and then presulfided by treatment with hydrogen sulfide at 700–800° F. for from 3 to 5 hours. This catalyst was used to treat a kerosene distillate whose properties are given in Table I. The evaluation of the finished kerosene products for several different operating conditions is given in Table II. The product of each of these runs has a +30 Saybolt color but was found to be fluorescent. The color of the product after dark, vented storage in the absence of iron for 8 months was still +30. In some of the runs, the color stability of the effluents in the presence of iron was poor.

In comparison, a series of runs made with the acid-digested form of the catalyst according to this invention are presented in Table III. The kerosene product after treatment with the acid-digested catalyst had a +30 Saybolt color and was also nonfluorescent. The color stability was also outstanding since none of the samples was found to be off-color after six months' dark, vented storage either with or without the presence of iron. Moreover, the product obtained at a temperature as high as 550° F. was not fluorescent and did not become off-color after storage. Also, the process of this invention, as shown by the data in Table III, effected a substantial degree of desulfurization of the kerosene.

Table I

PROPERTIES OF UNTREATED KEROSENE

| | |
|---|---|
| Gravity, API | 43.0 |
| ASTM distillation, °F.: | |
| 10% | 405 |
| 50% | 452 |
| 90% | 520 |
| B. P. | 553 |
| Refractive index, $n_D^{20}$ | 1.4511 |
| Saybolt color | +9 |
| Doctor test | Sour |
| Bromine number | 3.0 |
| Sulfur, wt. percent | 0.204 |

The color stability data above show that no darkening of the product occurred upon storage in the presence of iron (rusty nail) for from 4 to 6 months. Thus the process of this invention, utilizing the nitric acid-ammonium nitrate-digested catalyst, effected results superior to those obtainable with a commercially available catalyst.

Variation and modification are possible within the scope of the disclosure and the claims to this invention, the essence of which is that kerosene is rendered color-stable and nonfluorescent by contacting it, together with hydrogen, with a novel catalyst at a temperature in the range 500 to 650° F. and a pressure in the range 100 to 250 p. s. i.; that a novel catalyst is prepared by digesting a mixture of the oxides of molybdenum, silicon, and aluminum with nitric acid and ammonium nitrate followed by evaporation of the nitric acid and heating of the residue, and, preferably, treating the residue with hydrogen sulfide.

I claim:

1. A process which comprises contacting a color-unstable hydrocarbon, together with hydrogen, with a nitric-acid-digested sulfided molybdenum-silicia-alumina catalyst at temperature and pressure conditions effective to render said hydrocarbon color-stable and nonfluorescent, said catalyst having been made by the steps of (1) digesting a mixture, comprising from 2 to 20 weight percent molybdenum oxide, 0.1 to 10 weight percent silica, and the remainder alumina, with a mixture of nitric acid and ammonium nitrate, at a temperature in the range 100 to 300° F. for a time in the range 5 to 60 hours, the weight of nitric acid being chemically equivalent to from 0.5 to 5 times the weight of alumina present, the weight of ammonium nitrate being from 0.1 to 2 times the weight of alumina present, and the concentration of said nitric acid being in the range 40 to 80 weight percent; (2) evaporating the resulting mixture to dryness; (3) heating the residue to decompose nitrates present; (4) forming the residue into suitable particles for contacting; and (5) contacting said particles with hydrogen sulfide under sufiding conditions.

Table II

HYDROGEN REFINING OF KEROSENE WITH COMMERCIAL MoO₃—SiO₂—Al₂O₃ CATALYST

| Run No. | Operating Data | | | | Effluent Properties | | | | | Color Stability | | | | | |
|---|---|---|---|---|---|---|---|---|---|---|---|---|---|---|---|
| | Pressure, p. s. i. g. | Temp., °F. | Space Velocity, vol./vol./hr. | Hydrogen Flow, cu. ft./bbl. kerosene | Gravity, API | $n_D^{20}$ | Saybolt Color | Bromine No. | Sulfur, wt. per cent | With Rusty Nail | | | Without Nail | | |
| | | | | | | | | | | 4 Mo. | 6 Mo. | 8 Mo. | 4 Mo. | 6 Mo. | 8 Mo. |
| 105-2 | 100 | 600 | 1 | 2,200 | 42.4 | 1.4529 | +30 | 2.0 | 0.04 | | +30 | +30 | | +30 | +30 |
| 105-5 | 100 | 595 | 1 | 2,200 | 42.4 | 1.4530 | +30 | | | +30 | | +30 | +30 | | +30 |
| 105-11 | 100 | 610 | 1 | 4,600 | 42.4 | 1.4529 | +30 | 2.0 | 0.043 | | | | | | |
| 105-12 | 100 | 610 | 1 | 2,200 | 42.4 | 1.4529 | +30 | | | | | | | | |
| 105-13 | 100 | 610 | 1 | 1,200 | 42.4 | 1.4531 | +30 | 1.8 | 0.051 | +27 | +26 | +22 | +30 | +30 | +30 |
| 105-16 | 150 | 610 | 1 | 2,200 | 42.4 | 1.4530 | +30 | | | +22 | +16 | +12 | +30 | +30 | +30 |

The color stability data above show that appreciable darkening of the treated product occurred upon storage in the presence of iron (rusty nail) for from 4 to 8 months, as shown by the decreased Saybolt color values.

2. A process which comprises contacting a color-unstable kerosene, together with hydrogen, at a temperature in the range 500 to 650° F., a pressure in the range 100 to 250 p. s. i., a liquid hourly kerosene space

Table III

HYDROGEN REFINING OF KEROSENE WITH CATALYST OF THIS INVENTION (ACID-DIGESTED)

| Run No. | Operating Data | | | | Effluent Properties | | | | | Color Stability | | | |
|---|---|---|---|---|---|---|---|---|---|---|---|---|---|
| | Pressure, p. s. i. g. | Temp., °F. | Space Velocity, vol./vol./hr. | Hydrogen Flow, cu. ft./bbl. | Gravity, API | $n_D^{20}$ | Saybolt Color | Bromine No. | Sulfur, wt. per cent | With Rusty Nail | | Without Nail | |
| | | | | | | | | | | 4 Mo. | 6 Mo. | 4 Mo. | 6 Mo. |
| 20 II | 100 | 500 | 1 | 2,200 | 43.2 | 1.4503 | +30 | 2.2 | 0.062 | +30 | +30 | +30 | +30 |
| 21 II | 100 | 550 | 1 | 2,200 | 43.0 | 1.4506 | +30 | | | | +30 | | +30 |
| 22 II | 100 | 600 | 1 | 2,200 | 43.1 | 1.4506 | +30 | 1.7 | 0.033 | | +30 | | +30 |
| 23 II | 100 | 650 | 1 | 2,200 | 43.2 | 1.4501 | +30 | | | | +30 | | +30 |
| 24 II | 250 | 650 | 1 | 2,200 | 43.2 | 1.4505 | +30 | | | | +30 | | +30 | velocity in the range 1 to 2, and a hydrogen flow rate in the range 1000 to 5000 cubic feet per barrel of kerosene treated, in the presence of a catalyst prepared by the following enumerated steps: (1) digesting a mixture, comprising from 2 to 20 weight percent molybdenum oxide, 0.1 to 10 weight percent silica, and the remainder alumina, with a mixture of nitric acid and ammonium nitrate, at a temperature in the range 100 to 300° F. for a time in the range 5 to 60 hours, the weight of nitric acid being chemically equivalent to from 0.5 to 5 times the weight of alumina present, the weight of ammonium nitrate being from 0.1 to 2 times the weight of alumina present, and the concentration of said nitric acid being in the range 40 to 80 weight percent; (2) evaporating the resulting mixture to dryness; (3) heating the residue to decompose nitrates present; (4) grinding the residue; (5) adding an organic binder and forming the ground material into pellets; (6) heating the pellets in an oxygen-containing atmosphere at a temperature in the range 950 to 1050° F. for a time in the range 10 to 30 hours; and (7) contacting the pellets with hydrogen sulfide at a temperature in the range 700 to 800° F. for a time in the range 3 to 5 hours; and recovering a color-stable non-fluorescent kerosene as a product of the process.

3. The process of claim 2 in which the kerosene contacting is conducted at a temperature in the range 550 to 625° F. and a pressure in the range 150 to 225 p. s. i.

References Cited in the file of this patent

UNITED STATES PATENTS

| | | |
|---|---|---|
| 2,325,034 | Byrns | July 27, 1943 |
| 2,393,288 | Byrns | Jan. 22, 1946 |
| 2,398,175 | Cole | Apr. 8, 1946 |
| 2,417,308 | Lee | Mar. 11, 1947 |
| 2,575,445 | Porter et al. | Nov. 6, 1951 |
| 2,638,455 | Pitzer | May 12, 1953 |
| 2,694,671 | Baumgarten et al. | Nov. 16, 1954 |
| 2,705,733 | Nonnenmacher et al. | Apr. 5, 1955 |
| 2,706,167 | Harper et al. | Apr. 12, 1955 |

UNITED STATES PATENT OFFICE

CERTIFICATE OF CORRECTION

Patent No. 2,793,986

May 28, 1957

William C. Lanning

It is hereby certified that error appears in the printed specification of the above numbered patent requiring correction and that the said Letters Patent should read as corrected below.

Column 4, line 23, for "molybdenum" read --molybdena--.

Signed and sealed this 6th day of August 1957.

(SEAL)
Attest:
KARL H. AXLINE
Attesting Officer

ROBERT C. WATSON
Commissioner of Patents